(12) United States Patent
Struhl

(10) Patent No.: US 9,830,838 B2
(45) Date of Patent: Nov. 28, 2017

(54) UNIVERSAL LEG FOR A SIGN DISPLAY STAND

(71) Applicant: Clifford Struhl, Syosset, NY (US)

(72) Inventor: Clifford Struhl, Syosset, NY (US)

( * ) Notice: Subject to any disclaimer, the term of this patent is extended or adjusted under 35 U.S.C. 154(b) by 0 days.

(21) Appl. No.: 15/163,886

(22) Filed: May 25, 2016

(65) Prior Publication Data
US 2016/0351086 A1   Dec. 1, 2016

Related U.S. Application Data

(60) Provisional application No. 62/168,335, filed on May 29, 2015.

(51) Int. Cl.

| | | |
|---|---|---|
| *G06F 15/00* | (2006.01) | |
| *G09F 7/08* | (2006.01) | |
| *G09F 1/14* | (2006.01) | |
| *F16M 11/42* | (2006.01) | |
| *G09F 7/18* | (2006.01) | |
| *G09F 7/22* | (2006.01) | |
| *A47F 5/10* | (2006.01) | |
| *A47F 5/08* | (2006.01) | |
| *G09F 15/00* | (2006.01) | |

(52) U.S. Cl.
CPC ............... *G09F 7/18* (2013.01); *F16M 11/42* (2013.01); *G09F 1/14* (2013.01); *G09F 7/22* (2013.01); *A47F 5/0815* (2013.01); *A47F 5/101* (2013.01); *G09F 15/0012* (2013.01); *G09F 15/0056* (2013.01); *G09F 2007/1856* (2013.01)

(58) Field of Classification Search
CPC .... G09F 15/0012; G09F 7/18; G09F 15/0056; G09F 7/22; G09F 1/14; G09F 2007/1856; G02B 6/007; G02B 6/0091; F16M 11/42; A47F 5/0815; A47F 5/101
USPC ............ 248/457, 309.1, 150, 165, 460, 469, 248/441.1, 129; 40/543, 607.1, 611.2, 40/747

See application file for complete search history.

(56) References Cited

U.S. PATENT DOCUMENTS

| | | | | |
|---|---|---|---|---|
| 2,223,308 | A * | 11/1940 | Rovell ................. | G02B 6/0091 40/747 |
| 2,630,643 | A * | 3/1953 | Smithson .................. | G09F 7/08 267/163 |
| 3,128,573 | A * | 4/1964 | Cook .................... | A47B 23/007 108/49 |
| 4,144,664 | A * | 3/1979 | De Korte ............ | G09F 15/0056 40/609 |
| 4,520,584 | A * | 6/1985 | Howard .............. | G09F 15/0056 40/124.19 |
| 4,791,745 | A * | 12/1988 | Pohn .................... | G02B 6/0091 40/543 |

(Continued)

*Primary Examiner* — Tan Le
(74) *Attorney, Agent, or Firm* — Dilworth & Barrese, LLP; Michael J. Musella, Esq.

(57) ABSTRACT

Sign display stands include legs. A leg for a sign display stand includes: a first side; a second side; a base; an inner surface defined by the first side, the second side and the base; an outer surface defined by the first side, the second side and the base, the outer surface opposite the inner surface; a channel defined at or about at least one of the first side and second side on the inner surface, the channel configured to receive a sign panel; and at least one protuberance positioned on the inner surface and substantially along a longitudinal axis of the leg.

20 Claims, 12 Drawing Sheets

(56) References Cited

U.S. PATENT DOCUMENTS

| | | | | |
|---|---|---|---|---|
| 4,830,318 A | * | 5/1989 | O'Brien | A47F 5/105 |
| | | | | 248/165 |
| 5,215,285 A | * | 6/1993 | Lewis | G09F 1/14 |
| | | | | 248/457 |
| 5,331,757 A | * | 7/1994 | Ernest | G09F 15/0012 |
| | | | | 40/607.1 |
| 5,433,024 A | * | 7/1995 | Lerner | G02B 6/007 |
| | | | | 362/613 |
| 5,625,969 A | * | 5/1997 | Vogler | G09F 15/0012 |
| | | | | 40/611.12 |
| 2008/0129003 A1 | * | 6/2008 | Stengel | A47B 81/06 |
| | | | | 280/47.19 |
| 2016/0351086 A1 | * | 12/2016 | Struhl | G09F 7/18 |

* cited by examiner

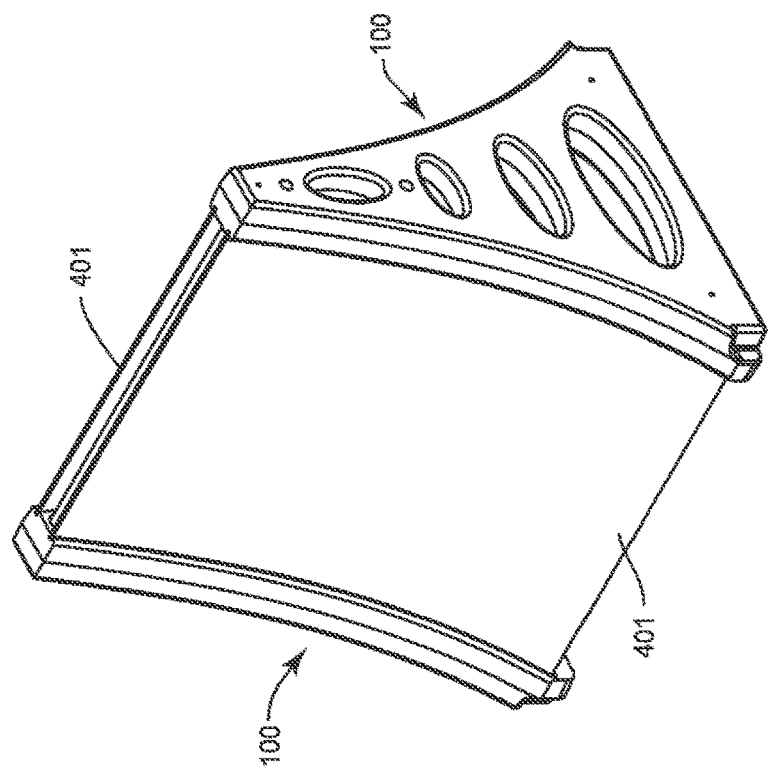
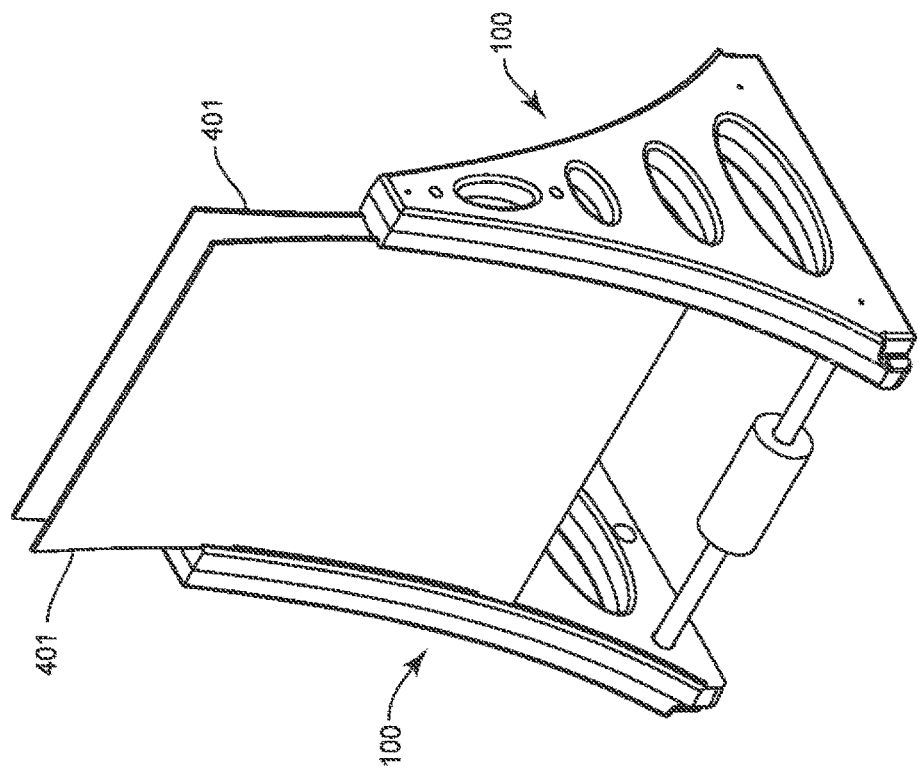

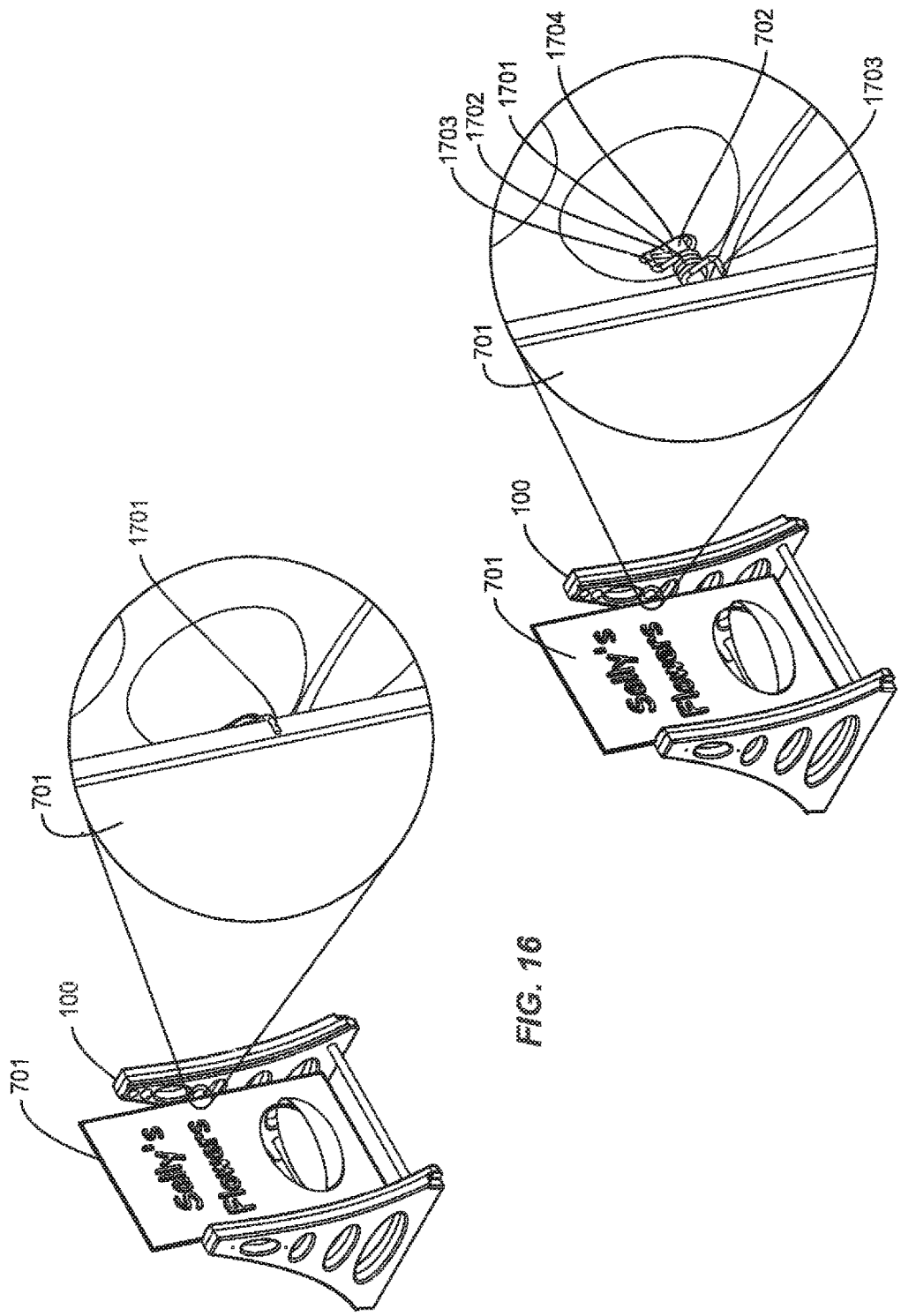

UNIVERSAL LEG FOR A SIGN DISPLAY STAND

REFERENCE TO PRIOR APPLICATIONS

The present application claims priority to U.S. Provisional Application No. 62/168,335, filed May 29, 2016, the entire contents of which are incorporated herein by reference.

TECHNICAL FIELD

The present disclosure generally relates to display stands, systems and components thereof for displaying free-standing signage, and more particularly, to a universal system for displaying different types of signs on a single display stand.

BACKGROUND

Various sign display stands are in use today. Many sign stands are tripod or 'A' in shape with many having a narrow profile to fit though doors and different widths or heights to display different sized sign panels. Many signs have either swinging or slide-in sign panels. There are no stands that accommodate either of a swinging panel and a slide-in sign panel, and no swinging sign accommodates different height sign panels from multiple pivot points. Most sign stands using interconnected legs use a variety of dedicated sizes and styles to accommodate either swinging or slide-in sign panels of different heights. Many signs use different leg designs for wheels and/or handles. There is no multi-use leg for different height swinging signs. In addition, most signs display single sized sign panels and do not offer interchangeability between swinging and slide in modes, or different heights for swinging signs.

The disclosure describes improvements over these prior art technologies utilizing a multi-use leg to accommodate either slide-in sign panels or swinging sign panels of different heights and sizes, plus the ability to switch between slide-in and swinging applications by changing low cost hardware and cross tubes, instead of the complete sign.

SUMMARY

Provided is a universal sign stand leg that can replace a multitude of parts to obtain a sign stand having multiple configurations for use with both swinging sign panels and slide in sign panels.

The universal sign stand leg is a multi-use, interchangeable, leg that allows the user to change sign panel size, height, format and display method quickly and easily without replacing the legs which are the most expensive part of the sign. With the universal leg the user has the most display options, plus the ability to add wheels for portability. From a manufacturing perspective the universal leg is less expensive to produce due to economies of scale and lower cost molding methods, and requires less inventory since 1 leg is replacing many different leg styles.

Accordingly, a sign display stand is provided. The sign display stand includes a leg having first side; a second side; a base; an inner surface defined by the first side, the second side and the base; an outer surface defined by the first side, the second side and the base, the outer surface opposite the inner surface; a channel defined at or about at least one of the first side and second side on the inner surface, the channel configured to receive a sign panel; and at least one protuberance positioned on the inner surface and substantially along a longitudinal axis of the leg.

A sign display stand, includes two legs, each leg includes a first side; a second side; a base; an inner surface defined by the first side, the second side and the base; an outer surface defined by the first side, the second side and the base, the outer surface opposite the inner surface; a channel defined at or about at least one of the first side and second side on the inner surface, the channel configured to receive a sign panel; at least one protuberance positioned on the inner surface and substantially along a longitudinal axis of the leg; and one or more cross tubes and/or cross rods for connecting the two legs in a spaced apart configuration.

BRIEF DESCRIPTION OF THE DRAWINGS

The present disclosure will become more readily apparent from the specific description accompanied by the following drawings, in which:

FIG. 5 is a perspective view of a partial assembled sign display stand according to the present disclosure;

FIG. 6 is a perspective view of an assembled sign display stand according to the present disclosure;

FIG. 16 is a perspective view of an assembled sign display stand showing a torsion spring according to the present disclosure;

FIG. 17 is a perspective view of a partially assembled sign display stand showing the torsion spring according to the present disclosure.

Like reference numerals indicate similar parts throughout the figures.

DETAILED DESCRIPTION

Figure 1:
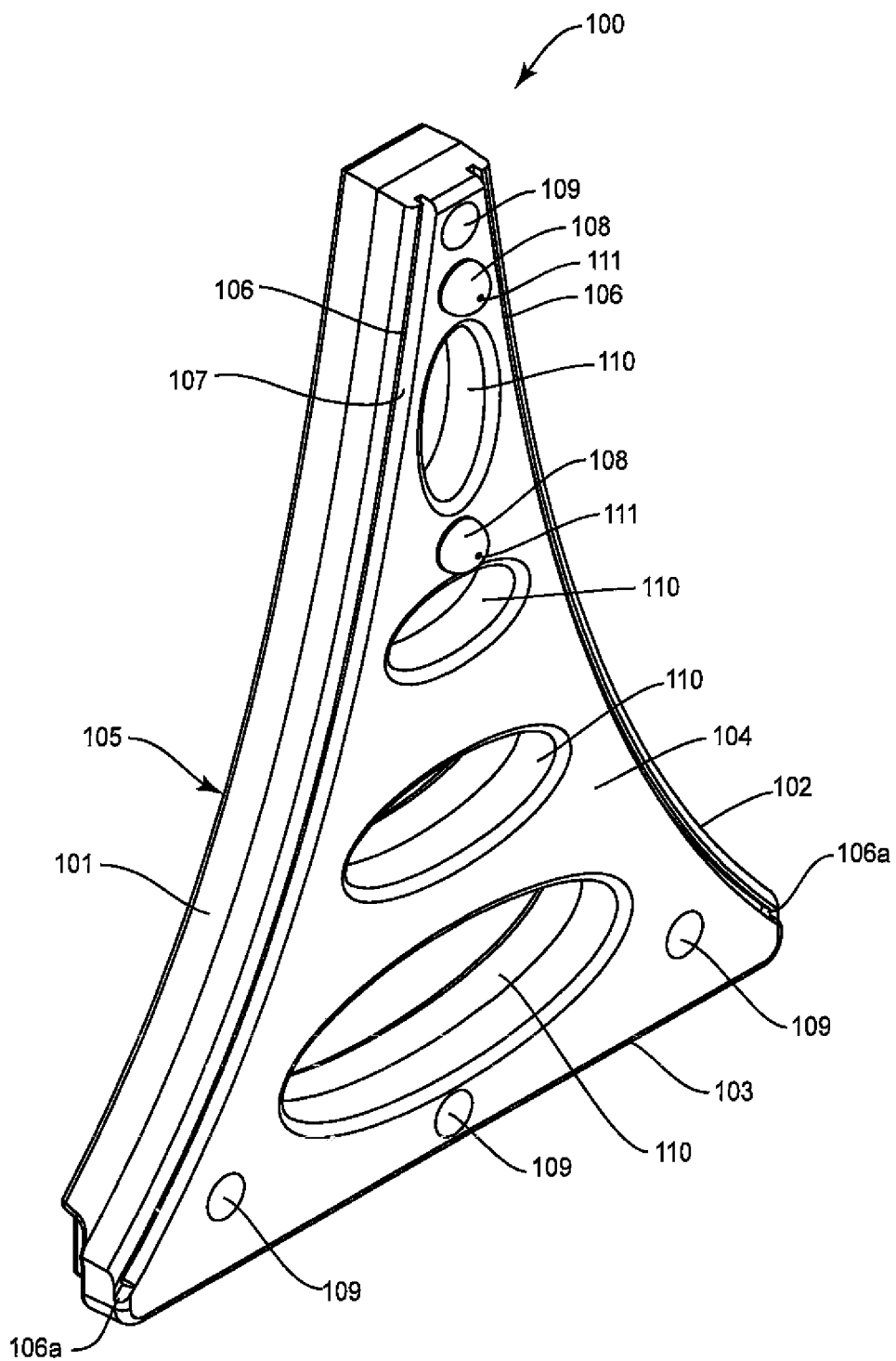
FIG. 1 is a perspective view of a sign display stand leg according to the present disclosure.
Figure 2:
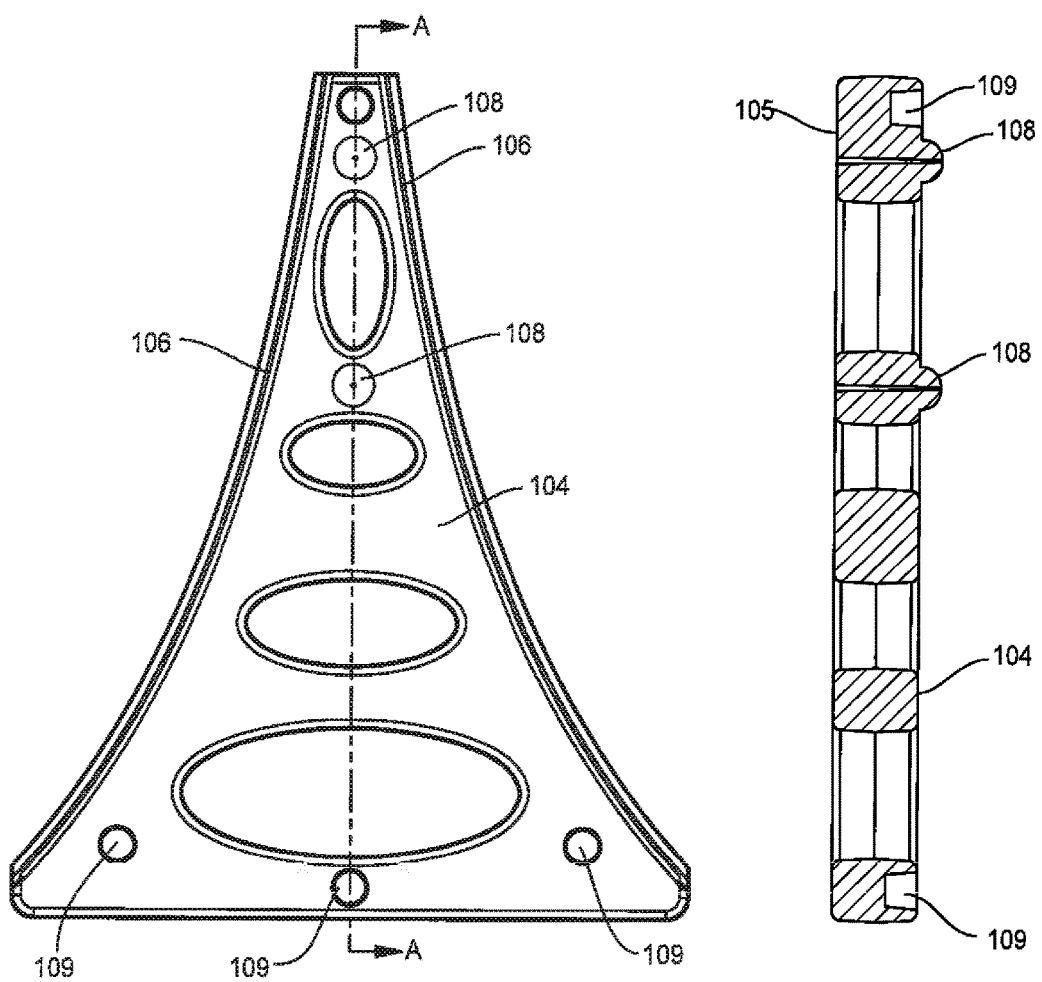
FIG. 2 is a plan view of a sign display stand leg according to the present disclosure.
Figure 3:
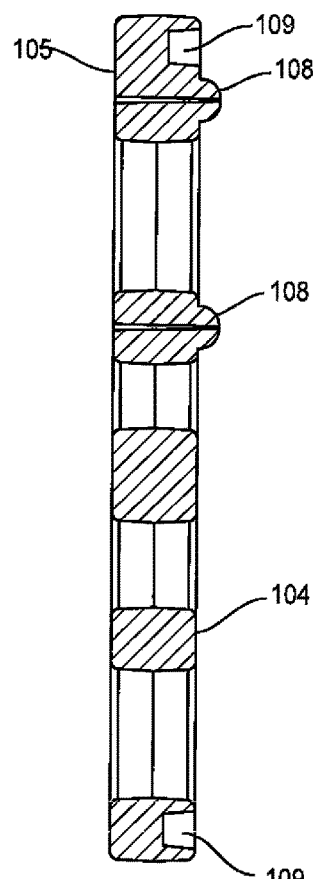
FIG. 3 is a side cross sectional view of a sign display stand leg according to the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A universal sign stand leg is disclosed herein that can replace a multitude of parts to obtain a sign stand having multiple configurations for use with both swinging sign panels and slide in sign panels.

Reference will now be made in detail to the exemplary embodiments of the present disclosure, which are illustrated in the accompanying figures.

As shown in FIGS. 1-10, a leg 100 for a sign display stand is includes a first side 101, a second side 102 and a base 103. First side 101, second side 102 and base 103 define an inner surface 104. An outer surface 105 (shown in FIG. 1) is also defined by first side 101, second side 102 and base 103, and is opposite to inner surface 104.

The shape of leg 100 can be a triangle as shown, but other shapes are contemplated. In addition, first side 101 and second side 102 can be concave (as shown), straight or convex, and can vary in degrees. The concave shape provides for extra support and strength to leg 100.

In addition, leg 100 can be designed with structural holes 110 for even greater strength and support. The curved shapes of structural holes 110 provide extra strength, but structural holes 110 can be of any varying shapes and sizes. Structural holes 110 also serve the purpose of reducing wind resistance of a sign display stand when assembled.

A channel 106 is formed at or about first side 101 on the inner surface. For a two sided display stand a second channel 106 is provided at or about second side 102. Channel 106 is shown with a similar contour as first side 101, but can be of a different contour. Channel 106 having the contour shown provides for extra support and strength of a slide-in sign panel when inserted (e.g., see FIG. 5). The width of channel 106 is sized to accept a slide-in sign panel, typically a width of ⅜ of an inch can accommodate most sign panels. Channel 106 typically includes a channel stop 106a positioned at the lower end of channel 106 to prevent the slide-in sign panel from sliding out of the bottom of channel 106.

In order to create a deeper back section for added support of a slide-in sign panel 401, a raised inner portion 107 can be configured on inner surface 104 of leg 100. Raised inner portion 107 can also prevent the slide-in sign panel 401 from blowing in. Raised inner portion 107 is shown in the figures as the entire inner surface 104 itself being raised, but other configurations are contemplated. For example, raised inner portion 107 can be configured as a raised edge or a series of raised sections, each of which would create the added support for the slide in sign panel 401.

Figure 11:
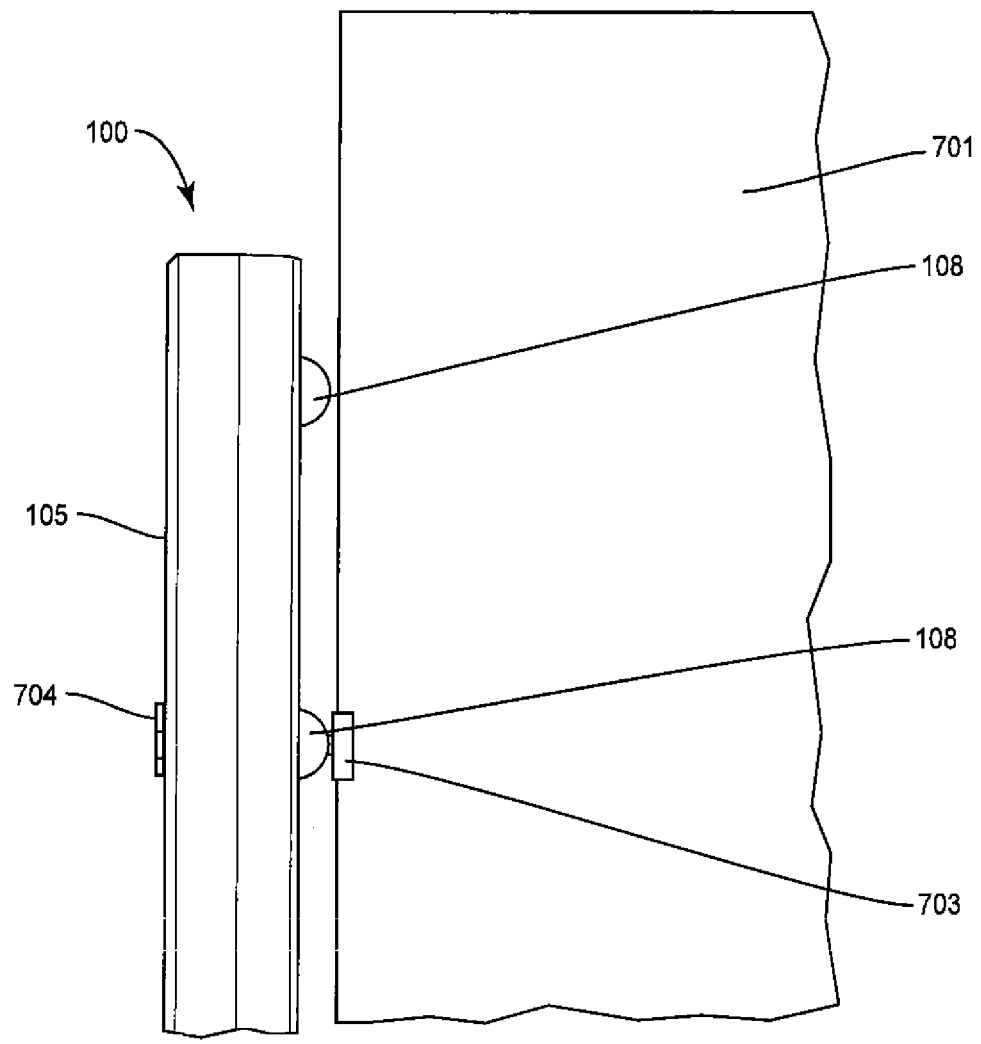
FIG. 11 is a partial front view of an assembled sign display stand according to the present disclosure.
Figure 12:
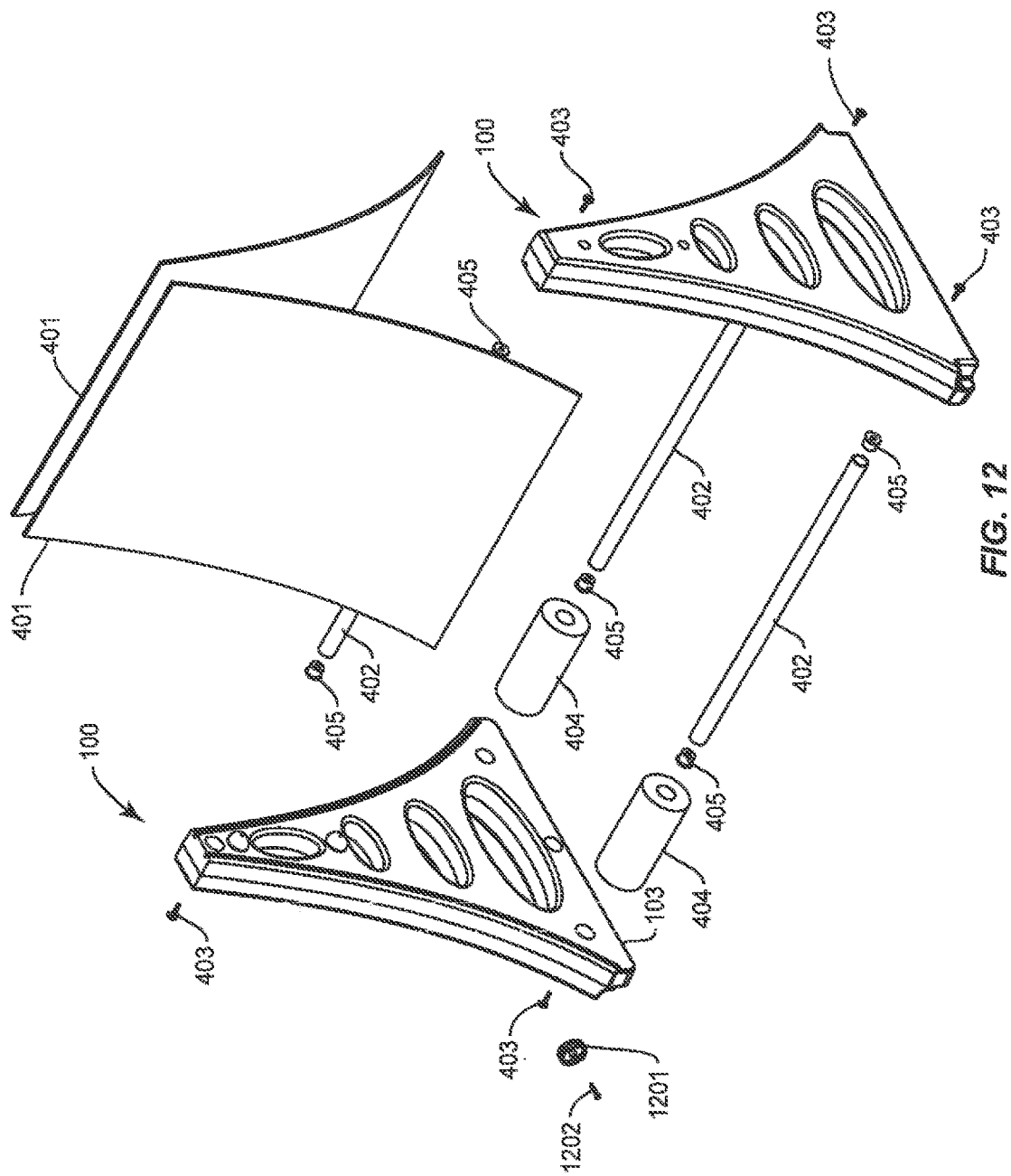
FIG. 12 is an exploded view of a sign display stand showing wheels according to the present disclosure.
Figure 15:
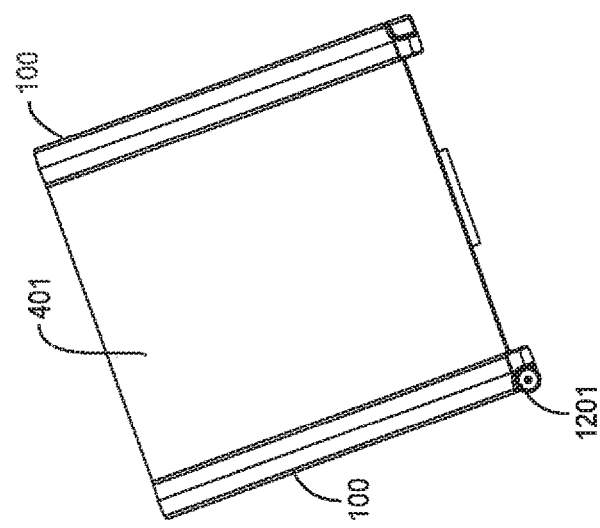
FIG. 15 is a perspective view of an assembled sign display stand showing wheels in use according to the present disclosure.
Figure 14:
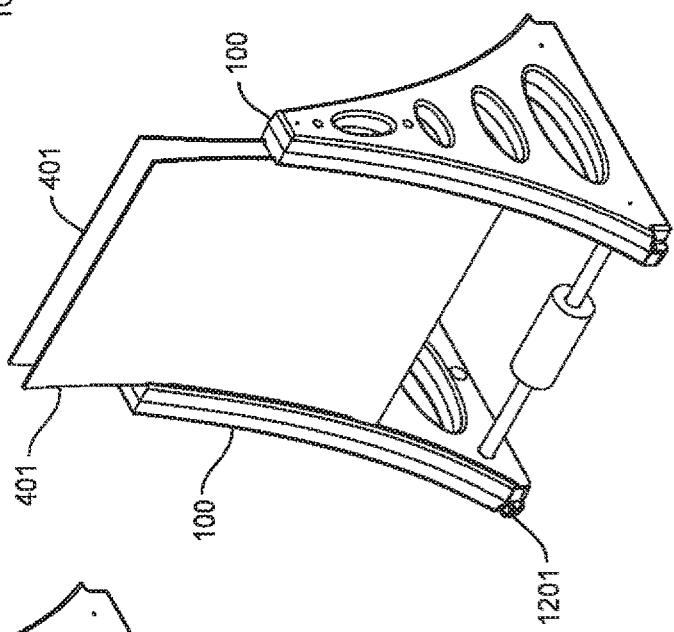
FIG. 14 is a perspective view of a partially assembled sign display stand showing wheels according to the present disclosure.
Figure 13:
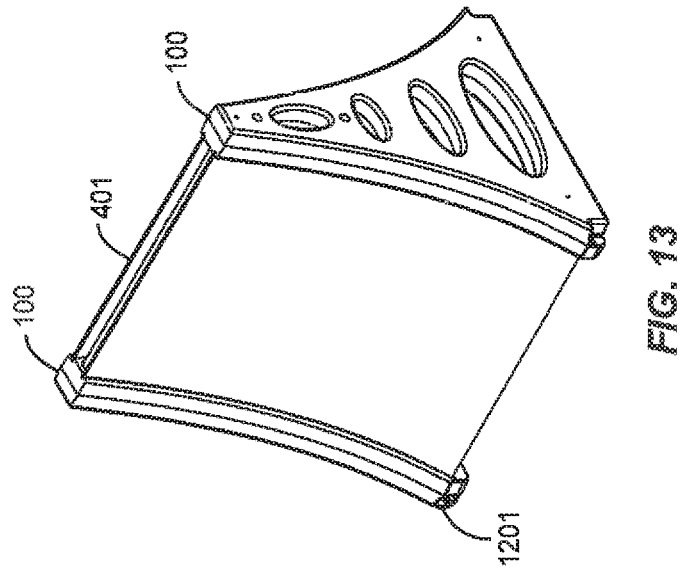
FIG. 13 is a perspective view of an assembled sign display stand showing wheels according to the present disclosure.

Positioned along a longitudinal axis of leg 100 are one or more protuberances 108. Each protuberance 108 includes a through hole 111 that extends through both inner surface 105 and outer surface 105. Protuberances 108 support cross rods 702 (see FIG. 7) to create pivot points (see FIG. 11) at various heights to accommodate different sized swinging sign panels 701/901 (see also FIG. 9). Protuberances 108 can be used with or without spacers or U channels 703 to allow the swinging sign panel 701 to swing freely.

As shown in FIGS. 16 and 17, protuberances 108 may include holes 1704 configured to accept a torsion spring 1701 that goes around the pivot point (i.e. cross rod 702) with perpendicular arms 1703 that go onto or into both the side of a swinging sign panel 701 and into the protuberance 108 in order to limit the travel of the swinging sign panel 701 in either direction. Other configurations of a torsion spring or other resilient member to accomplish the results are contemplated.

Leg 100 can include one or more recess 109 for cross tubes 402. Recesses 109 typically include through holes for hardware (e.g., screw 403). Cross tubes 402 connect 2 legs 100 and provide spacing for sign panel(s) 401, 701 or 709. Three or more cross tubes 402 can be used for slide-in sign panel(s) 401. Two or more cross tubes 402 and a cross rod 702 can be used for swinging sign panels 701 or 901. Cross tubes 402 and cross rods 702 can be supplied in a variety of lengths with shorter cross tubes 402 and/or cross rods 702 being used to display a vertical sign panel, and longer cross tubes 402 and/or cross rods 702 being used to display a horizontal sign panel. A cross tubes 402 inserted into upper recess 109 can be used to display a banner (not shown). Although recesses 109 are described herein, one skilled in the art will understand a stand can be assembled using leg 100 without recesses 109.

Figure 4:
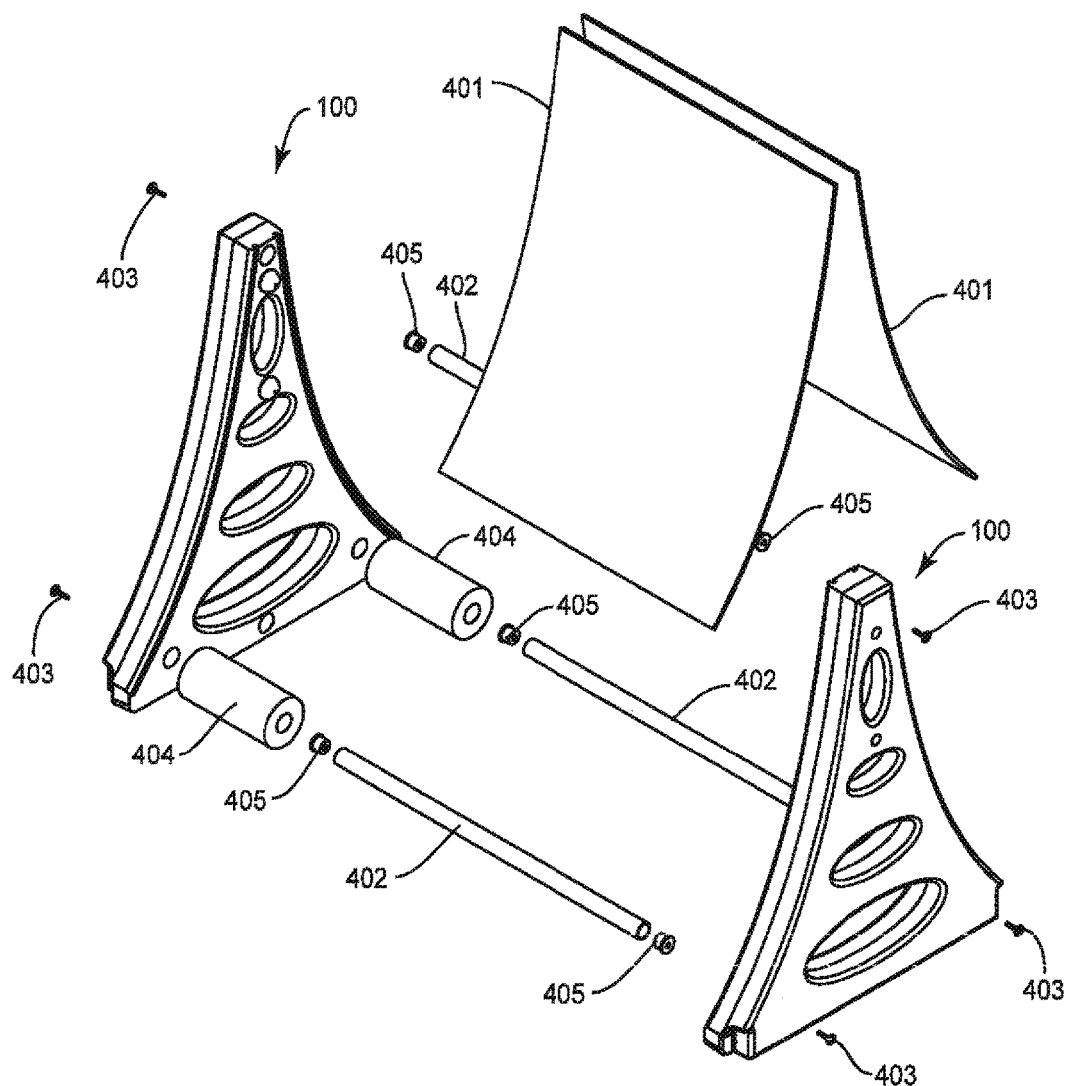
FIG. 4 is an exploded view of a sign display stand according to the present disclosure.

FIGS. 4-6 illustrate slide-in sign panel stands in various degrees of assembly utilizing universal leg 100. In addition to the components described above, assembled stand also can include a spacer 404 to provide support to slide-in sign panel 401. Inserts 405 can also be used to provide support and strengthen cross tube 402. FIG. 4 is an exploded view of a sign stand with universal legs 100 in its slide-in sign panel configuration. FIG. 5 is a partially assembled sign stand with universal legs 100 in its slide-in sign panel configuration. FIG. 6 is an assembled a sign stand with universal legs 100 in its slide-in sign panel configuration.

FIGS. 7-10 illustrate swinging sign panel stands having different sized sign panels in various degrees of assembly utilizing universal leg 100. In addition to the components described above, assembled stand also can include one or 2 knob(s) 704 to attach to a threaded end of cross rod 702 to hold cross rod 702 in place.

Figure 7:
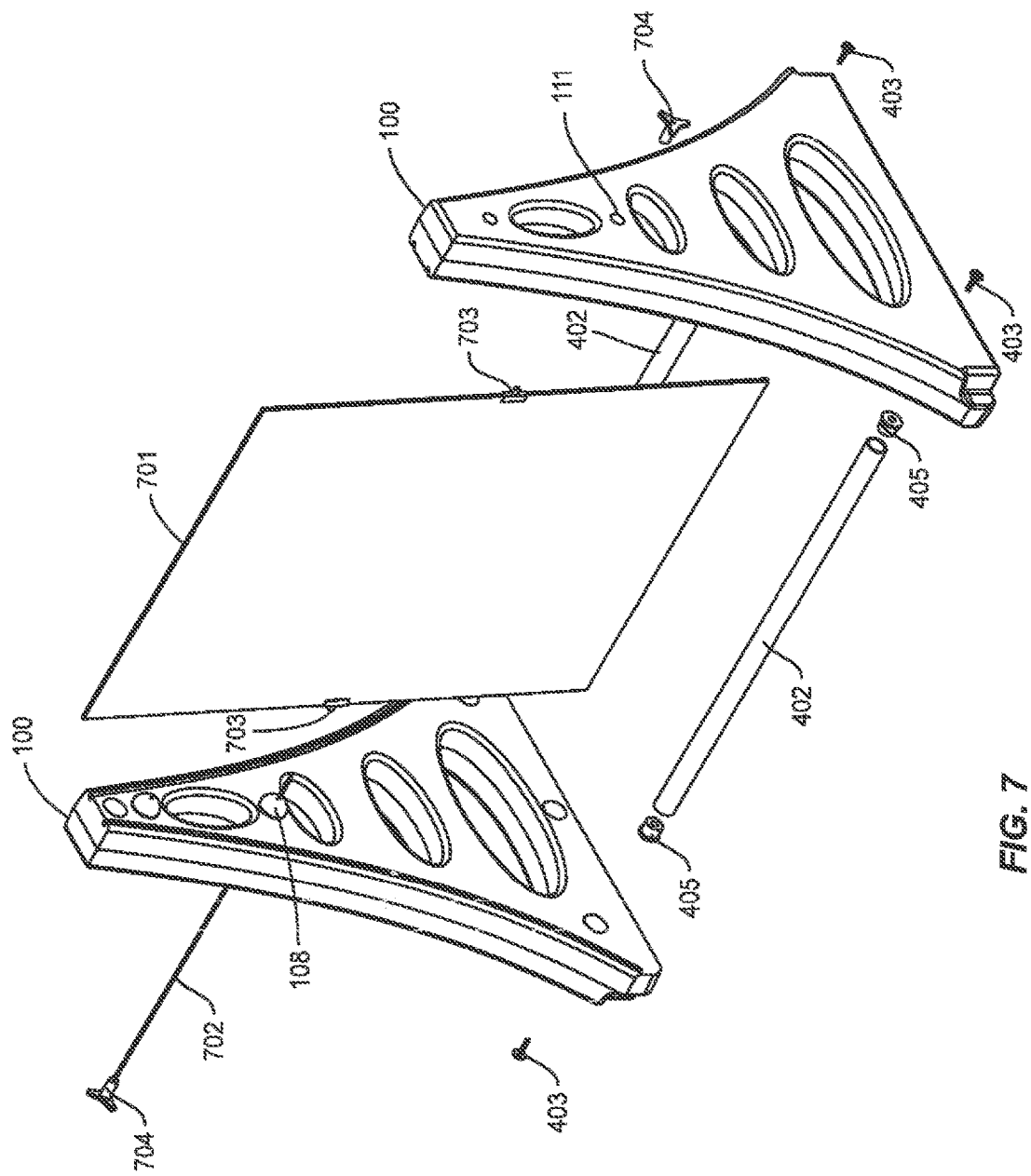
FIG. 7 is an exploded view of a sign display stand according to the present disclosure.
Figure 8:
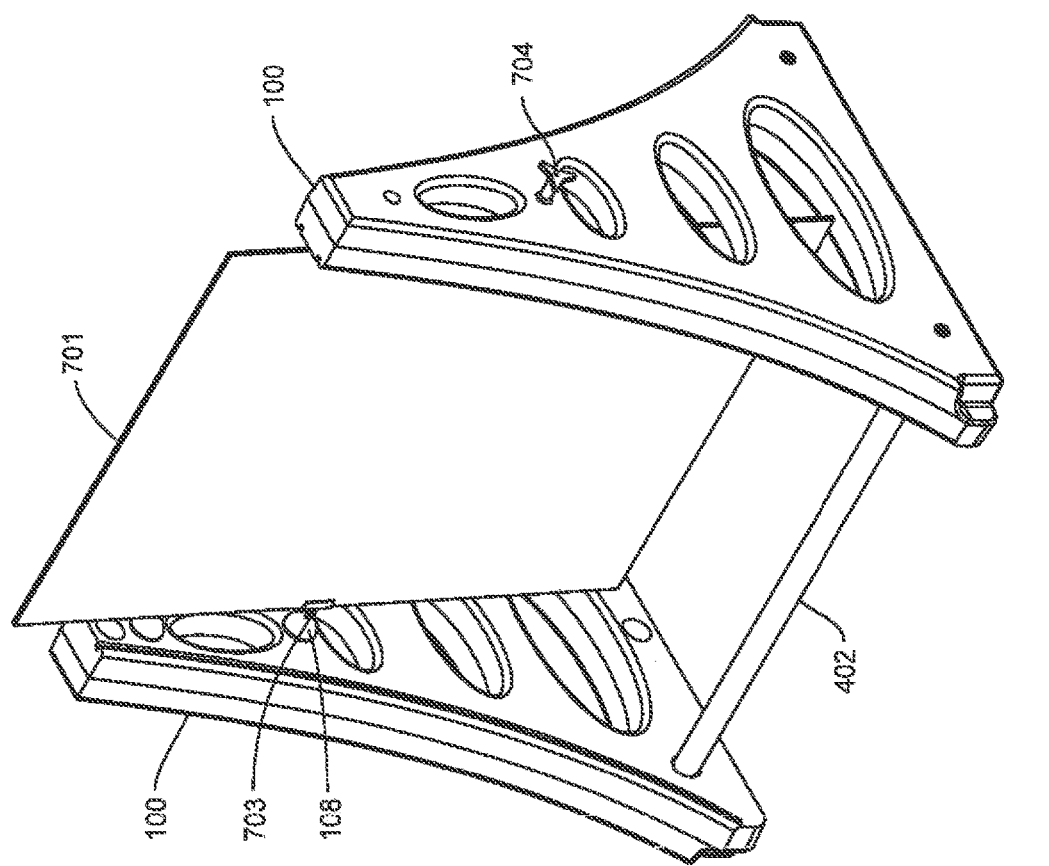
FIG. 8 is a perspective view of an assembled sign display stand according to the present disclosure.

FIG. 7 is an exploded view of a sign stand with universal legs 100 in its swinging sign panel configuration, FIG. 8 is an assembled sign stand with universal legs 100 in its swinging sign panel configuration. This configuration is using a smaller swinging sign panel 701 that utilizes a lower set of protuberances 108.

Figure 9:
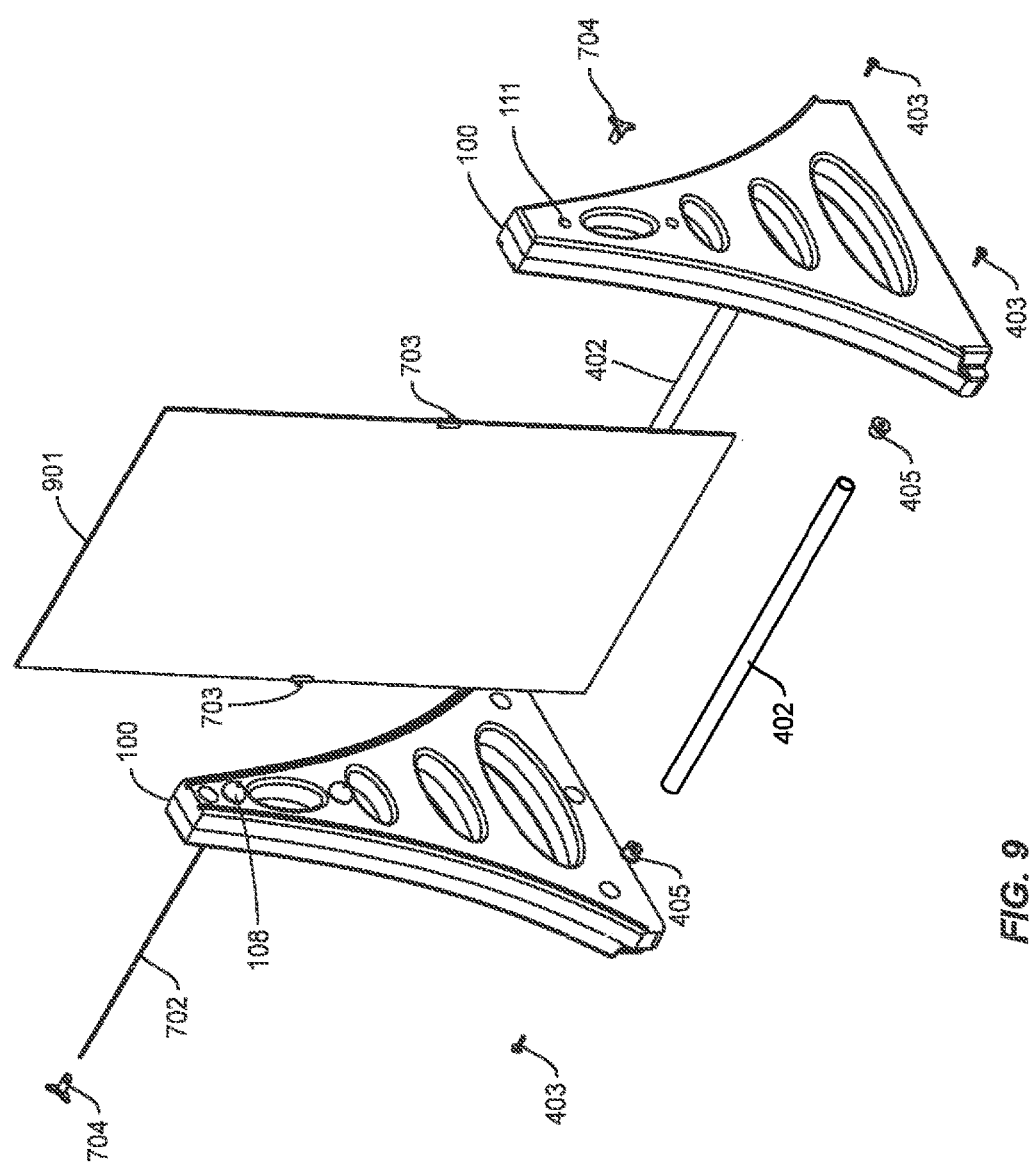
FIG. 9 is an exploded view of a sign display stand according to the present disclosure.
Figure 10:
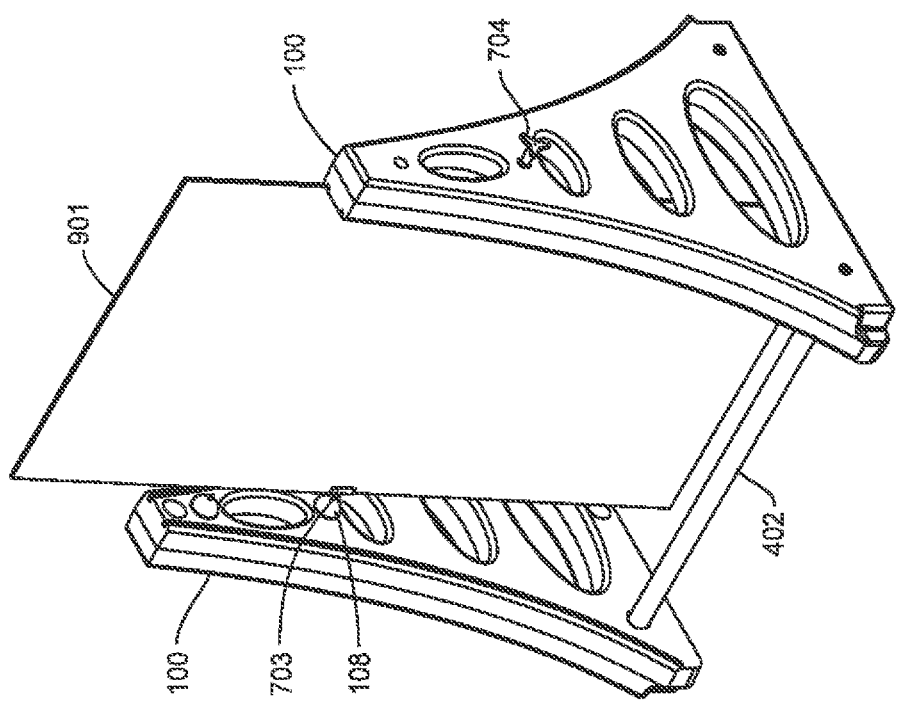
FIG. 10 is a perspective view of an assembled sign display stand according to the present disclosure.

FIG. 9 is an exploded view of a sign stand with universal legs 100 in its swinging sign panel configuration. FIG. 10 is an assembled sign stand with universal legs 100 in its swinging sign panel configuration. This configuration is using a larger swinging sign panel 901 that utilizes an upper set of protuberances 108.

As shown in FIGS. 12-15, leg 100 can include wheels 1201 positioned along the bottom of base 103 to facilitate easy moving of the assembled stand. The wheels can be removable. In addition, and also not illustrated, leg 100 can include one or more foot pads in addition to or to replace a wheel 1201, and positioned at the bottom of base 103. The foot pad can be of a rubber material to prevent the stand from sliding on a surface.

The components of the system can be fabricated from materials suitable for display stand applications, including, but not limited to, metal(s), plastic(s), wood(s), combinations thereof; etc. Various components of the system may be fabricated from material composites, including the above materials, to achieve various desired characteristics such as strength, rigidity, elasticity, flexibility, compliance, performance, and durability. The components of the system, individually or collectively, may also be fabricated from a heterogeneous material such as a combination of two or more of the above-described materials.

Where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A leg for a sign display stand, the leg comprising:
   a first side;
   a second side;
   a base at a downward end of the leg, wherein the first side and the second side extend upward from opposite ends of the base;
   an inner surface extending upward from an edge of the base and intersecting the first side and the second side at edges of the inner surface;
   an outer surface extending upward from an edge of the base opposite the inner surface and intersecting the first side and the second side at edges of the outer surface, the outer surface facing a direction opposite the inner surface;
   a first channel located in the inner surface at a position closer to the first side than to the second side the first channel configured to receive an edge of a sign panel; and
   at least one protuberance extending outward from the inner surface and positioned on the inner surface substantially along a longitudinal axis of the leg,
   wherein the protuberance defines a hole extending through the leg, from the inner surface to the outer surface, the hole adapted for receiving a sign panel cross rod or cross tube.

2. The leg of claim 1, wherein the inner surface and the outer surface have a substantially triangular configuration.

3. The leg of claim 1, further comprising a raised inner portion next to at least part of the channel.

4. The leg of claim 1, wherein the first side and the second side each have a top portion opposite the respective edges that are connected to the base and the inner surface has a first protuberance positioned at or about a point where the top portion of the first side connects to the top portion of the second side.

5. The leg of claim 4, wherein a second protuberance extends outward from the inner surface and is positioned on the inner surface lower than the first protuberance.

6. The leg of claim 1, further comprising a second channel in the inner surface, closer to the second side than to the first side, the second channel configured to receive an edge of a sign panel.

7. The leg of claim 1, further comprising one or more cross tubes and/or cross rods for connecting the leg to a second leg.

8. The leg of claim 7, wherein the inner surface defines a plurality of recesses for receiving the cross tubes and/or cross rods.

9. The leg of claim 1, further comprising at least one wheel positioned on a lower part of the base.

10. The leg of claim 1, further comprising at least one foot pad positioned on a lower part of the base.

11. A sign display stand, comprising the leg of claim 1.

12. A sign display stand, comprising:
    two legs, each leg comprising:
    a first side;
    a second side;
    a base at a downward end of the leg, wherein the first side and the second side extend upward from opposite ends of the base;
    an inner surface extending upward from an edge of the base and intersecting the first side and the second side at edges of the inner surface;
    an outer surface extending upward from an edge of the base opposite the inner surface and intersecting the first side and the second side at edges of the outer surface, the outer surface facing a direction opposite the inner surface;
    a first channel located in the inner surface at a position closer to the first side than to the second side, the first channel configured to receive an edge of a sign panel;
    at least one protuberance extending outward from the inner surface and positioned on the inner surface and substantially along a longitudinal axis of the leg; and
    one or more cross tubes and/or cross rods for connecting the two legs in a spaced apart configuration for receiving at least one sign panel there between.

13. The stand of claim 12, wherein the protuberance defines a hole extending from the inner surface to the outer surface for receiving a sign panel cross rod.

14. The stand of claim 12, further comprising a raised inner portion next to at least part of the channel.

15. The stand of claim 12, wherein the first side and the second side each have a top portion opposite the respective edges that are connected to the base and the inner surface has a first protuberance positioned at or about a point where the top portion of the first side connects to the top portion of the second side.

16. The stand of claim 15, wherein a second protuberance extends outward from the inner surface and is positioned on the inner surface lower than the first protuberance.

17. The stand of claim 12, further comprising a second channel in the inner surface, closer to the second side than to the first side, the second channel configured to receive an edge of a sign panel.

18. The stand of claim 12, wherein the inner surface defines a plurality of recesses for receiving the cross tubes.

19. The stand of claim 12, further comprising at least one wheel positioned on a lower part of one base.

20. A leg for a sign display stand, the leg comprising:
    a first side;

a second side;

a base at a downward end of the leg, wherein the first side and the second side extend upward from opposite ends of the base;

an inner surface extending upward from an edge of the base and intersecting the first side and the second side at edges of the inner surface;

an outer surface extending upward from an edge of the base opposite the inner surface and intersecting the first side and the second side at edges of the outer surface, the outer surface facing a direction opposite the inner surface;

a first channel located in the inner surface at a position closer to the first side than to the second side, the first channel configured to receive an edge of a sign panel;

at least one protuberance extending outward from the inner surface and positioned on the inner surface and substantially along a longitudinal axis of the leg; and one or more cross tubes and/or cross rods for connecting the leg to a second leg.

\* \* \* \* \*